US010772293B2

(12) United States Patent
Jerina et al.

(10) Patent No.: US 10,772,293 B2
(45) Date of Patent: Sep. 15, 2020

(54) ANIMAL FEED ACTIVITY COLLECTION APPARATUSES, METHODS AND SYSTEMS

(71) Applicant: PURINA ANIMAL NUTRITION LLC, Shoreview, MN (US)

(72) Inventors: Michael Jerina, Eureka, MO (US); Mark Caldwell, Labadie, MO (US); Mary Beth Gordon, Wappingers Falls, NY (US); Douglas Schmidt, Union, MO (US)

(73) Assignee: PURINA ANIMAL NUTRITION LLC, Arden Hill, MN (US)

( * ) Notice: Subject to any disclaimer, the term of this patent is extended or adjusted under 35 U.S.C. 154(b) by 216 days.

(21) Appl. No.: 15/148,709

(22) Filed: May 6, 2016

(65) Prior Publication Data

US 2017/0318779 A1    Nov. 9, 2017

(51) Int. Cl.
*A01K 5/02*    (2006.01)
*A01K 29/00*   (2006.01)
*A01K 1/10*    (2006.01)

(52) U.S. Cl.
CPC ............ *A01K 5/0283* (2013.01); *A01K 1/105* (2013.01); *A01K 29/005* (2013.01)

(58) Field of Classification Search
CPC ...... A01K 5/0283; A01K 5/02; A01K 5/0114; A01K 5/0275; A01K 5/00; A01K 29/005; A01K 5/0225; A01K 5/0233; A01K 1/105

USPC ...................... 119/51.02, 52.1, 61.2
See application file for complete search history.

(56) References Cited

U.S. PATENT DOCUMENTS

| 7,603,965 | B1* | 10/2009 | Betts ................... A01K 3/00 119/516 |
| 9,913,454 | B2* | 3/2018 | Van Buuren ......... A01K 1/0209 |
| 2005/0161007 | A1* | 7/2005 | Huisma ................ A01K 11/006 119/842 |
| 2007/0137584 | A1* | 6/2007 | Travis .................. A01K 5/02 119/51.02 |
| 2012/0089340 | A1* | 4/2012 | Huisma ................ A01K 5/02 702/19 |

* cited by examiner

*Primary Examiner* — Peter M Poon
*Assistant Examiner* — Jeffrey R Larsen
(74) *Attorney, Agent, or Firm* — Dorsey & Whitney LLP

(57) ABSTRACT

Systems and methods provide automated data collection of feed behavior and intake for animals in confinement where the animal ingests feed from a feed station that includes a first and second feed container each of which holds a feed that is freely accessible to the animal, and a respective first and second weight sensor each of which senses a change in weight of the respective feed in the container. A processor is configured to transmit instructions to cause it to receive from the weight sensors, a plurality signals indicative of a change in weight in the first and second feed containers. The processor records a reduction in weight sensed by the first or the second sensor as consumption of the respective feed, and records a change in weight sensed by the first or the second sensor as feeding activity at the respective feed container.

11 Claims, 3 Drawing Sheets

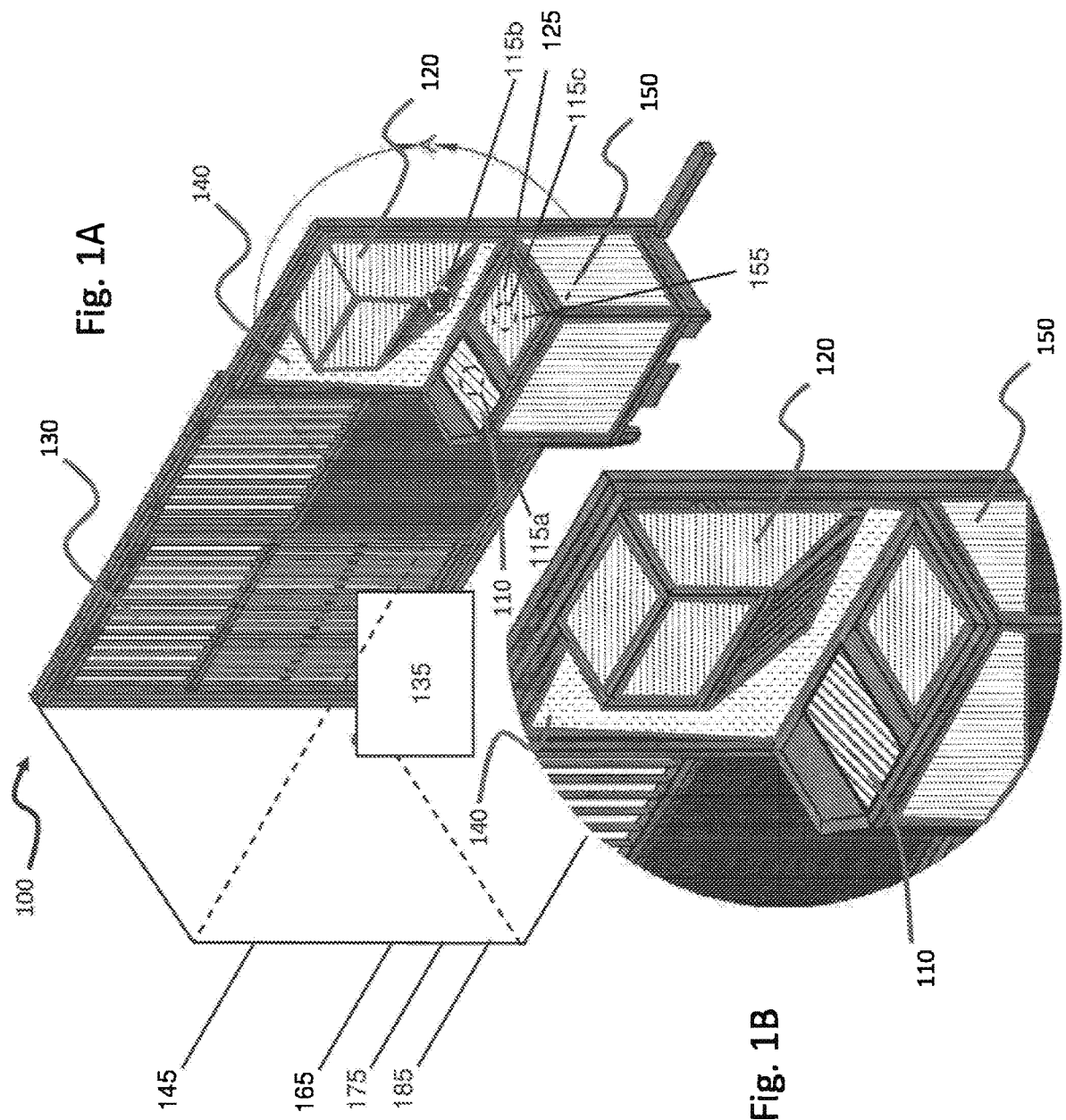

ANIMAL FEED ACTIVITY COLLECTION APPARATUSES, METHODS AND SYSTEMS

TECHNICAL FIELD

Implementations relate to animal feed activity collection apparatuses, methods and systems for sensing and evaluating animal behavior associated with consumption of animal feeds and other feed-related activities.

BACKGROUND

Animals derive their nutrition through a variety of feed sources. Some rely at least partly on forages including hay, pasture grass, and other plant materials. Commercial feeds for animals in confinement also offer nutrition formulated for different animals and specific purposes. Such feeds may be in the form of textured feeds, pellets, extruded nuggets, each with varying nutrient profiles, appearance and consistency. Diet formulations of forages and feed are commonly tailored to a specific animal to improve or maintain the animal's health. For instance, equine feeds may facilitate equine weight gain by incorporating additional sources of fat directly into the feed nuggets. However, high-fat feed is typically much less palatable to equine animals than similar feeds with less fat. Thus, before a commercial feed is formulated, animal feeding behavior is studied to determine whether the animal will accept the formulation. These studies are often conducted on animals in confinement. The confined settings may be similar to the settings the animal would otherwise experience, with feed intake being monitored by a technician weighing a remaining amount of feed after the animal has consumed feed from a feed supply dedicated to the animal. For instance, ruminants in group confinement may each be fitted with an RFID tag in a Calan gate system, which allows for the feeding of the ruminants on an individual basis by allowing the ruminant to have access only to their assigned feeding stall on the basis of the system sensing the RFID for the animal assigned to a feeding stall and permitting access, e.g., opening a small gate, to allow the animal to insert their head into a feeding station to feed. Animal feeding behavior can be affected not only by the feed formulation, but also by the presence of people, such as observers manually recording feed intake. The animal may be deterred from eating if the animal feels threatened by the person, or may be inclined to eat more if the animal has familiarity with the person. In either situation, the results of the intake by the animal may be inaccurate with respect to the animal's affinity, or lack thereof, to the feed composition offered. Therefore, there is a need to study feeding behavior of animals in confinement that solves the problems associated with studying intake of feed in the presence of humans.

SUMMARY

Accordingly, the systems and methods herein provide automated data collection of feed behavior and intake for animals in confinement.

According to one implementation, a feed data collection system includes a first feed container; a first weight sensor adapted to sense a change in weight in the first feed container; a second feed container; a second weight sensor adapted to sense a change in weight in the second feed container; a processor configured to transmit instructions to cause the processor to receive from the weight sensors, a plurality signals indicative of a change in weight in the first and second feed containers, where the processor: records a reduction in weight sensed by the first or the second sensor as consumption of the respective feed, and records a change in weight sensed by the first or the second sensor as feeding activity at the respective feed container.

According to certain implementations and alternatives, at least the feed containers and the weight sensors are positioned within an animal feeding station adapted to confine an animal, and the feeding station may include a gate.

According to certain implementations and alternatives, the system additionally includes a surface proximate one of the feed containers and a third weight sensor adapted to sense a change in weight on the surface. The processor compares a change in weight on the surface with a change in weight of the feed container proximate the surface and records an overall reduction in weight as consumption of the feed held with the container, and records a change in weight sensed by the third weight sensor as feeding activity.

According to another implementation, a method of feeding a confined animal involves feeding the confined animal within an enclosure comprising a gate configured to provide the confined animal with ingress and egress to an enclosure that houses a feed station, the enclosure having a size adapted to allow the entire body of the confined animal to be accommodated within the enclosure, and the feed station comprising: a first feed container which holds a first feed that is freely accessible to the animal within the enclosure; a first weight sensor which senses a change in weight of the first feed in the first feed container; a second feed container which holds a second feed different from the first and that is freely accessible to the animal; and a second weight sensor which to senses a change in weight of the second feed in the second feed container.

According to certain implementations and alternatives, the weight sensor is a load cell. In addition or alternatively, one of the first or second feed containers is mounted to a wall of the feed station and is configured to hold forage. In addition or alternatively, the feed station includes a surface adapted to receive forage that falls from the wall-mounted feed station, and a third weight sensor adapted to sense a change in weight of the surface. In such cases, the other of the first or second feed containers is configured to hold a grain-based, dry feed. In addition or alternatively, the enclosure is an animal pen, stable or a barn; a shield positioned proximate to the first and second feed containers, wherein while the animal consumes the feeds at the feed station, the shield blocks the animal's visibility to an exterior of the feed station; and/or weight sensor housing is provided for holding at least a portion of one of the first and second weight sensors.

According to certain implementations and alternatives, the method further involves providing a processor configured to transmit instructions to cause the processor to receive from the weight sensors, a plurality signals indicative of a change in weight in the first and second feed containers.

BRIEF DESCRIPTION OF THE DRAWINGS

FIGS. 1A-1C depict a feed station that may be used in connection with the feed activity collection system according to certain embodiments.

DETAILED DESCRIPTION

Feed activity collection systems provide approaches for analyzing the feeding behavior of animals in confinement without the need for observers manually recording the animal's intake and activities surrounding meals. The systems are applicable in research and development settings and measure a variety of aspects of the animal's feeding behavior, which are unlike conventional commercial feeding operations that do not record information related to feeding behavior and intake. In prior approaches, systems were unable to collect information about an animal's feed intake such as feeding intake and behavior data as it relates to multiple feed types.

Figure 1C:
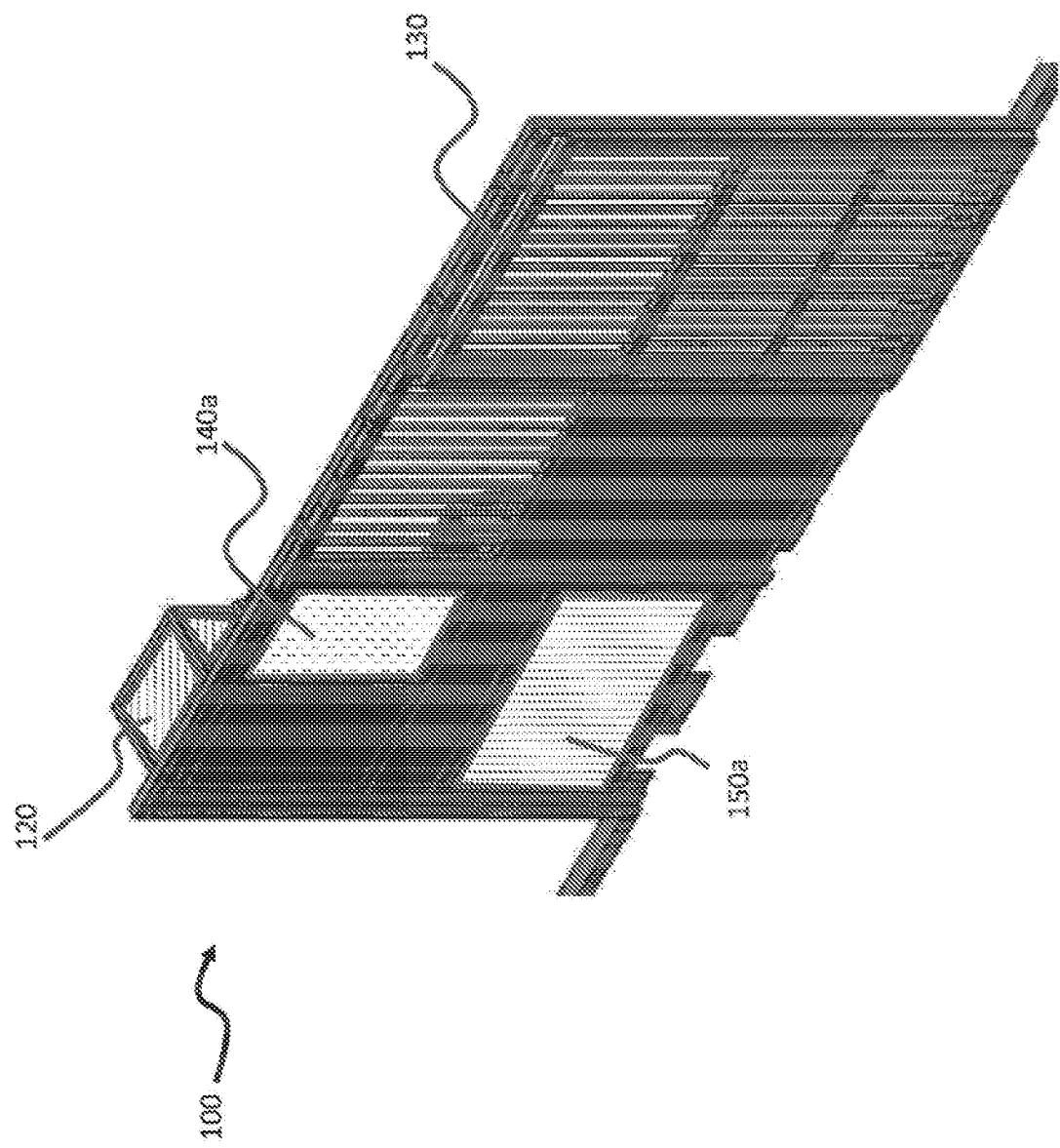

The animal feed activity collection system may be included within a feed station for the confined animal. The feed station may include a gate, a fence or barrier blocking egress, at least a first feed source and a first weight sensor of the animal feed activity collection system for the first feed source, a second feed source and second weight sensor of the collection system for the second feed source, additional feed sources and respective weight sensors of the collection system, a shield, as well as other components commonly found in animal pens, such as a water trough. FIGS. 1A-1C depict a feed station 100 according to certain embodiments. The feed station 100 may accommodate one or more feed containers 110, 120 adapted to hold animal feeds and configured to provide the animal with feed ad libitum, e.g., free access to the feed. For instance, when the confined animal is present at the feed station, the animal is not restricted from accessing the feed in the feed container(s) by structures such as a Calan gate or other devices that block access to the feed by the animal, and implementations may be free of Calan gates.

The feed container(s), e.g., 110, 120, may be configured for a particular type of feed to be ingested by the animal. A dry feed container, such as feed container 110, may include an open top with a shape similar to a feed trough or concentrate bin. A forage container, such as a suspended feed container 120, may include a hopper for receiving forage and slotted openings (e.g., a grate) to enable the animal to nibble and pull forage from the suspended container. The forage container may be mounted to a vertical surface of the feed station, e.g., vertical wall, and may be configured as a wall-mounted hay manger. These feed containers may include a surface 125 arranged below the suspended container for catching and holding any forage that falls out of the container or the animal's mouth, making the forage available for consumption by the animal. This surface may be a flat surface freely accessible to the animal, and in some implementations, may be associated with or form a portion of the forage container for purposes of monitoring feed intake of the feed within the forage container, according to the present disclosure. A water container may be configured as a water trough.

The weight sensors of the animal feed activity collection system may be mounted to a surface of the feed station 100, and the sensors, or a surface of the feed station coupled to the sensors, may be adapted to receive or contact the feed containers. For instance, a weight sensor 115a may be positioned below the feed container 110 for sensing a change in weight of the feed held therein, another weight sensor 115b may be mounted on the suspended feed container 120 for sensing a change in weight of the feed held therein, and a separate weight sensor 115c may be positioned below the surface 125 arranged beneath the suspended feed container 120 for sensing a change in weight thereon, for instance, when a feed in the suspended feed container 120 falls out or falls from the animal's mouth, the separate weight sensor 115c positioned below the feed container senses a weight increase, and when feed is removed, e.g., eaten, from the surface, the weight sensor senses a weight decrease.

The feed station may include or be arranged within a confined space in which the animal may be suitably housed for periods of time. As depicted in FIGS. 1A and 1C, the confined space may include a gate 130 configured to provide the animal with ingress and egress to an enclosure 145 that houses at least the feed containers of the feed station. The gate may be manually or automatically operated. The enclosure 145 may have a size adapted to allow the entire body of the confined animal 135 to be accommodated within the enclosure and freely move and reside therein, e.g., consume feed, ambulate and rest. For instance, the enclosure may be an animal pen 165, a stable 175 or a barn 185. The enclosure may generally be for confining a single animal, such as a horse, ruminant, pig, or other livestock or companion animal. In a particular example, the enclosure may be a horse pen.

A shield structure, e.g., shield 140, may be a component of the feed station and positioned proximate to the monitored feed container(s). The feed container(s) may be adjacent the shield structure with a size and shape to block the animal's view outside of the feed station. More particularly, the shield may be a vertical wall with a sufficient size so that when the animal is feeding or active at the feed container, their view is of the feed container and the vertical wall. In other words, the shield may block the animal from seeing objects or activities outside of the feed station, which may facilitate obtaining more accurate feed intake and behavior measurements. The vertical wall may be configured as a movable shield, e.g., 140a, such as an access door, hinged shutter or slidable wall, to enable user access to the feeding station (e.g., for adding feed to the feed container 110) without the user being required to enter the confined space. This may enable the movable shield to be in a closed position during feeding times, and optionally, in an open position at other times.

A housing 150 for the weight sensor(s) may be a component of the feed station and may protect the weight sensors(s) and associated components of the feed activity collection system. The weight sensor housing may include an access point, e.g., door 150a, that allows a user to gain access to the weight sensor(s) from an exterior of the confined space.

Figure 2:
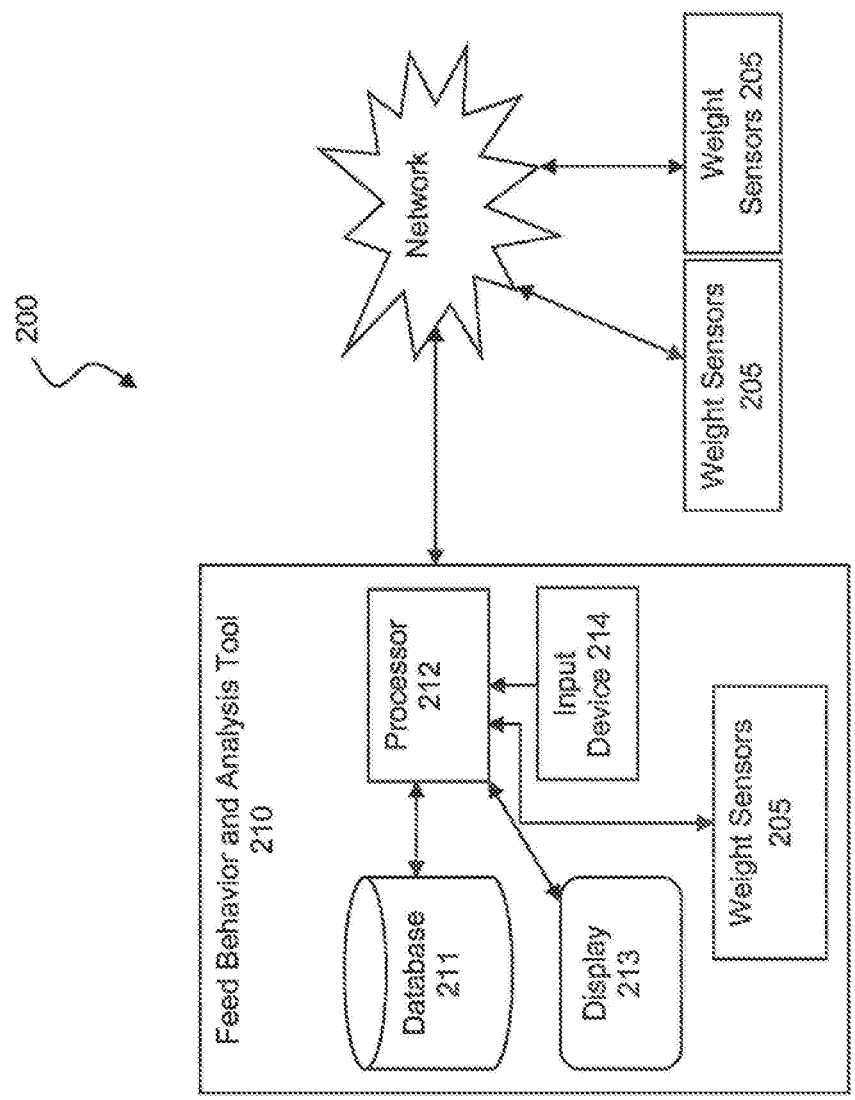
FIG. 2 is a block diagram of feed activity collection system for analyzing the feeding behavior of animals in confinement, according to certain implementations.

FIG. 2 is a block diagram of feed activity collection system 200 for analyzing the feeding behavior of animals in confinement, according to certain implementations. The system 200 includes weight sensors 205 and a feed behavior and analysis tool 210 with a database 211, a processor 212, a display 213, and an input device 214 (e.g. a keyboard or remote control). In some implementations, the feed behavior and analysis tool 210 may be one or more special purpose computers.

The weight sensors 205 of the animal feed activity collection system may be adapted to sense a change in weight of the feed within the feed containers. These sensors 205 may be configured as load cells, which include a transducer that generates an electrical signal with a magnitude that is directly proportional to the force being measured. Types of load cells may include, but are not limited to: pneumatic load cells, strain gauge load cells, piezoelectric load cells, and hydraulic load cells. A single load cell or multiple load cells may be used to sense a change in weight of the feed within a single feed container. For instance, one weight sensor may be used to measure a weight of dry, grain-based feed within a container, while two or more weight sensors may be used to measure a weight of forage associated with a forage container. Other types of weight sensors may include, but are not limited to flow sensors for sensing a flow of liquid to determine a displaced volume of liquid having a known density. Flow sensors may include displacement meters.

The database 211 is configured to store the information required to generate reports on animal feed behavior and intake. The information stored includes nutrient profile (e.g., protein, fat, starch, fiber, NDF, NDFd) and feed component identity information for a variety of animal feeds, including the animal feeds within the feed containers. For dry, grain-based feeds, the grains, vitamins, minerals, additives as well as the nutrient profile may be stored according to each feed variety. For forage, the nutrient profile and forage source may be provided.

The processor 212 of the feed behavior and analysis tool 210 is specially-programmed to communicate with the weight sensors 205 for receiving weight sensor information and generating feed behavior pattern information and intake data based thereon. The processor 212 and the weight sensors 205 may communicate continuously or periodically to determine whether a change in weight in the feed container has occurred. Each of the weight sensors 205 may communicate individually with the processor 212, or alternatively, each weight sensor may be dedicated to a single processor, and this processor may be communicatively-coupled to other specially-configured components of the animal feed activity collection system 200.

The processor 212 of the animal feed activity collection system 200 may be specially-configured to display the generated reports on a user interface. For instance, the reports may display the animal's visits to the feeding station and amount of each type of feed consumed for each meal. The processor 212 may also be configured to transmit content to the display 213 such as analysis reports of animal's feed behavior and intake in relation to each feed type and overall feed ingestion. Further, the processor 212 is communicatively coupled to the input device 214 and is configured to receive input such as user selections. The display 213 may be a conventional display device such as a computer monitor, and the input device 214 may be a conventional keyboard or a remote control.

In some implementations the system 200 may be communicatively coupled to a communications network 215 for enabling a number of weight sensors 205 to provide weight readings for feeds being ingested by animals.

Other sensors that may be used in connection with the animal feed activity collection system 200 include but are not limited to: activity sensors, proximity sensors, GPS sensors, and animal weight sensors. Activity sensors may track the activity of the animal and may record distances traveled, speed, ambulatory time, rest time, calories burned and so on. Proximity or GPS sensors may indicate the animal's proximity to a feed station or other portion of an area in which the animal is confined. For example, the time the animal is present at the feed station may be tracked and compared with the amount of time the animal engages with the feed containers as determined by the weight sensors, and this information may provide additional feeding behavior activity. In another example, a proximity, GPS, or other sensor may indicate the presence of external or extraneous activity proximate to the feed station, which may be a factor that affects the animal's feeding behavior, and thus may impact the accuracy of the behavior and intake results. In this case, the animal feed activity collection system may be configured to disregard the data collected as anomalous when such a sensor indicates such external activity. For instance, the data for the entire meal or a portion of the meal may be discarded from the data set. Additional weight sensors may be included with the animal feed activity collection system and may be positioned in locations for sensing the presence of the animal or a change in weight of the animal.

In some implementations, the processor 212 of the animal feed activity collection system may be specially-configured to record a change in weight upon receiving weight sensor information for at least a minimum threshold change in weight. For instance, the minimum threshold may be about +/−0.1 lbs. Reduction of weight in the feed container may be recorded as consumption of the feed by the processor. Both reduction and addition of weight may be recorded as activity at the feed container. The processor may be programmed to generate reports of the animal's feed behavior and intake using recorded information such as amounts consumed, duration of activity at the feeders (e.g., meal duration), number of bites taken, time between bites taken, average weight consumed per bite, periods of extended feeder activity with consumption, periods of extended feeder activity without consumption, non-feed consumption activity (e.g., where weight increases are present due to the animal pressing on the feed containers but no sensed reduction of weight), periods of no activity or consumption, and periods of extended time away from the feeder.

In addition or alternatively, the processor 212 may use the recorded feed intake data and nutrient and feed component data stored in database 211 to generate a breakdown of the nutrients and feed components consumed from the feed containers. In further implementations, reports may provide correlations between consumption behavior and the nutrients and/or feed components within the feeds using historical information on consumption behavior of animal feeds with known compositions and nutrient profiles. This may enable identification of nutrients and/or feed components that may be preferred or not preferred by the animal.

Methods of using the animal feed activity collection system 200 may involve feeding a confined animal, at least during meal time, using one or more freely accessible feed containers associated with the weight sensors 205 of the animal feed activity collection system 200. Prior to the animal feeding, a weight of the feed held within the feed containers may be measured and saved to the system 200. The weight sensors may be initiated, e.g., reset, upon initiating a meal or other feed behavior observation.

During feeding, the processor(s) 212 of the animal feed activity collection system 200 poll the weight sensor(s) 205, for instance, using a timer. A timer may use a logic loop that keeps a previous "saved" weight of the feed in an array to keep track of the load cell(s) that the indicator controls. The timer may trigger every 5 second or other pre-determined timeframe. If the value of the weight is collected is different than the "saved," value by a pre-determined amount (e.g. +/−0.1, 0.2, 0.3, 0.4, or 0.5 lbs.), then the new weight is saved in the database 211 for the particular load cell being monitored. If the value is not sufficiently different, then the previous saved weight is retained and the timer is restarted. Each load cell may be set to the same predetermined threshold for triggering a new saved value, or the thresholds may differ. The data collected for each data collection cycle may include, but is not limited to, a station and/or animal identifier, a container and/or feed identifier, a weight sensor identifier for each weight sensor, a date, time and a weight.

Accordingly, the processor 212 may, inter alia, receive, from the weight sensor(s) 205, signals indicative of a change in weight in the first and second feed containers. A reduction in weight sensed by the first or the second sensor may be recorded by the processor 1125 as consumption of the respective feed. A change in weight sensed by the first or the second sensor may be recorded by the processor 212 as feeding activity at the respective feed container.

According to certain implementations, the processor 212 may determine that the animal is no longer feeding from the feed containers and the animal's mealtime has ended. For instance, where the processor 212 does not save new weight values for any feed container being monitored after polling the weight sensors 205 a predetermined number of times, the system 200 may determine that the animal is finished feeding. In this case, the processor 212 may cease polling the weight sensors 205 and may signal to a user that the animal's mealtime is over, for instance, by signaling an alarm sensed by the user (e.g., using visually, audibly, or tactile approaches) and/or displayed on a display. This may enable the user to remove or replace the feed within the feed containers.

Where weight sensors 205 operate in concert, such as when two weight sensors are assigned to a single feed container, e.g., feed container 120, the data may be collected and compared with one another to determine whether there is a reduction in total weight of the feed, or whether the total weight of the feed was redistributed between sensors. For instance, a forage container may initially hold a total weight of the forage, and this total weight may be measured by a first weight sensor. During feeding, some of the forage may be consumed while some may fall to a surface below the forage container. This surface may be coupled to a second weight sensor adapted to sense a change in weight on the surface, and the sensor may transmit an increase in weight to the system. The system 200 may determine an overall change in weight by comparing the weights measured by each of the sensors 205. Similarly, when forage is removed, e.g., consumed by the animal, from the surface, the weight sensor coupled to the surface may transmit a decrease in weight, for an overall reduction in weight of the forage being monitored. In this example, an overall reduction in weight between the two sensors may be recorded as consumption of the feed held with the feed container 120, and a change in weight sensed by the weight sensor coupled to the surface may be recorded as feeding activity generally and/or in relation to the feed container 120.

As provided herein, the processor 212 may be specially-programmed to record a change in weight at the feed container upon reaching a threshold change, such as +/−0.1 lbs. A 0.1 lb. reduction may be recorded as consumption, while a 0.1 lb. increase or reduction may be recorded as activity at the feed container. The number of times the threshold decrease occurs during a mealtime may be recorded as the number of bites taken. The weight of each bite may be recorded. The duration of a meal may be determined based on a time when a first bite is taken until the last bite, as determined when no more feed activity is sensed by the system.

When two or more feed containers and respective weight sensors are used in connection with feeding a single animal, the processor 212 may receive sensed information for each weight sensor. This enables the system to evaluate feeding behavior such as frequency of tries between the feed types. Meal information that may be generated includes total consumption of individual feeds and the feeds in combination, the number of visits to the feed station and to each feed container, the length of the visits to the feed station and to each feed container, the amount eaten during each visit to the feed station and at each feed container, the rate of consumption at the feed station and at each feed container and the total time of the meal. Here, the first and second feed containers may contain different feeds for consumption by the animal. This may enable the animal's consumption behavior and consumption patterns to be measured for two types of feedstuffs consumed by the animal. For instance, the feedstuffs may be a forage component and a concentrate component.

Providing the animal feed activity collection system 200 that monitors and evaluates behavior and intake with respect to two or more separately, but simultaneously provided feeds gives the ability for the animal to access to multiple feeds on a free choice basis, while the system accurately measures activity and intake for each feed type individually and in combination. For instance, both forage and a grain-based, dry feed may be accurately measured using the system. Types of grain-based, dry feeds include but are not limited to: feed concentrates, feed pellets, feed nuggets, and textured feeds. Other animal feeds include but are not limited to grains, beans, and forage such as grasses and hay, and combinations thereof. Animal feed may include water or liquids containing nutrients. Alternatively, certain approaches may monitor only certain types of feed, such as forage and grain consumption, and may not monitor consumption of water or other feed types.

In addition, the system 200 may be coupled to one or multiple feed stations, e.g., via the sensors 205 coupled over the network 215, enabling the system to monitor and evaluate the feeding behavior and intake of multiple animals simultaneously.

Implementations of the present disclosure may be particularly useful in evaluating feeding behavior of animals that are particular in their preferences and eating behaviors, such as horses. Animal feed activity collection systems allow changes to be made to potential or existing products that are very minute. Those changes can then be evaluated to make changes to feed products in production and to develop new products. Those skilled in the art understand, the system is valuable for research and development, and commercial applications would not find this system financially beneficial.

Aspects of the present disclosure may be provided as a specially-programmed computer program product, or software, that may include a non-transitory machine-readable medium having stored thereon instructions, which may be used to specially-program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium; optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter. The form described is merely explanatory, and it is the intention of the following claims to encompass and include such changes.

While the present disclosure has been described with reference to various embodiments, it will be understood that these embodiments are illustrative and that the scope of the disclosure is not limited to them. These and other variations, modifications, additions, and improvements may fall within the scope of the disclosure as defined in the claims that follow.

What is claimed is:

1. A feed data collection system, comprising:
a first feed container accessible to an animal;
a first weight sensor adapted to sense a change in weight in the first feed container;
a second feed container separate from the first feed container but accessible to the animal simultaneously with the first feed container;
a second weight sensor adapted to sense a change in weight in the second feed container;
a third weight sensor adapted to sense a change in weight on a surface below the second feed container;
a processor configured to transmit instructions to cause the processor to receive from all of the weight sensors, a plurality of signals indicative of a change in weight in the first and second feed containers,
where the processor:
records a reduction in weight sensed by the first or the second sensor as consumption of the respective feed,
records a change in weight sensed by the first or the second sensor as feeding activity at the respective feed container, and
compares the change in weight on the surface below the second feed container with a change in weight of the second feed container and records an overall reduction in weight as consumption of the feed held within the second container and records the change in weight on the surface below the second feed container as feeding activity.

2. The system of claim 1, wherein at least the feed containers and all of the weight sensors are positioned within an animal feeding station adapted to confine the animal.

3. The system of claim 2, wherein the feeding station comprises a gate.

4. A method of feeding a confined animal, comprising:
feeding the confined animal within an enclosure comprising:
a gate configured to provide the confined animal with ingress and egress to the enclosure, the enclosure housing a feed station and having a size adapted to allow the entire body of the confined animal to be accommodated within the enclosure, the feed station comprising:
a first feed container adapted to hold a first feed that is freely accessible to the animal within the enclosure;
a first weight sensor adapted to sense a change in weight of the first feed held in the first feed container;
a second feed container adapted to hold a second feed different in type from the first feed, wherein the second feed is freely accessible to the animal simultaneously with the first feed held in the first feed container;
a second weight sensor adapted to sense a change in weight of the second feed held in the second feed container; and
a third weight sensor positioned below the first feed container to sense a change in weight of a surface below the first feed container in response to the first feed falling from the first feed container.

5. The method of claim 4, wherein the first and second weight sensors are load cells.

6. The method of claim 4, wherein the first feed container is mounted to a wall of the feed station and is configured to hold forage, and the second feed container is not mounted to the wall.

7. The method of claim 6, wherein the second feed container is configured to hold a grain-based, dry feed.

8. The method of claim 4, wherein the enclosure is an animal pen, stable or a barn.

9. The method of claim 4, further comprising a shield positioned proximate to the first and second feed containers, wherein while the animal consumes the feeds at the feed station, the shield blocks the animal's visibility to an exterior of the feed station.

10. The method of claim 4, further comprising a weight sensor housing for holding at least a portion of one of the first and second weight sensors.

11. The method of claim 4, further comprising a processor configured to transmit instructions to cause the processor to receive from all of the weight sensors, a plurality of signals indicative of a change in weight in the first and second feed containers.

* * * * *